US008401775B2

(12) United States Patent
Rozovski et al.

(10) Patent No.: US 8,401,775 B2
(45) Date of Patent: Mar. 19, 2013

(54) SYSTEMS AND METHOD FOR MANAGING AIRPORT GROUND TRAFFIC

(75) Inventors: David Rozovski, Lafayette, IN (US); Juliana J. Goh, Kirkland, WA (US); Jean M. Crane, Seattle, WA (US); Michael E. Dey, Lake Forest Park, WA (US)

(73) Assignee: The Boeing Company, Chicago, IL (US)

( * ) Notice: Subject to any disclaimer, the term of this patent is extended or adjusted under 35 U.S.C. 154(b) by 671 days.

(21) Appl. No.: 12/363,341

(22) Filed: Jan. 30, 2009

(65) Prior Publication Data

US 2010/0198489 A1 Aug. 5, 2010

(51) Int. Cl.
*G08G 1/123* (2006.01)
*G01C 21/34* (2006.01)

(52) U.S. Cl. ........ 701/120; 701/122; 701/425; 701/428; 340/972; 340/995.14; 340/995.16; 340/995.19

(58) Field of Classification Search .................. 701/117, 701/120, 122, 411, 414, 425, 428; 340/953, 340/972, 995.14, 995.16, 995.19, 995.21, 340/995.23
See application file for complete search history.

(56) References Cited

U.S. PATENT DOCUMENTS

| | | | | |
|---|---|---|---|---|
| 6,411,890 | B1 | 6/2002 | Zimmerman | |
| 6,751,545 | B2 | 6/2004 | Walter | |
| 6,920,390 | B2 | 7/2005 | Mallet et al. | |
| 7,222,017 | B2 | 5/2007 | Clark et al. | |
| 7,706,973 | B2 * | 4/2010 | McBride et al. | 701/423 |
| 7,788,028 | B2 * | 8/2010 | Matsuoka et al. | 701/425 |
| 7,813,845 | B2 * | 10/2010 | Doose et al. | 701/16 |
| 2003/0009278 | A1 * | 1/2003 | Mallet et al. | 701/120 |
| 2003/0045994 | A1 * | 3/2003 | Stratton et al. | 701/120 |
| 2003/0160708 | A1 * | 8/2003 | Knoop | 340/958 |
| 2004/0225432 | A1 * | 11/2004 | Pilley et al. | 701/117 |
| 2009/0118997 | A1 * | 5/2009 | Truitt | 701/120 |
| 2011/0196599 | A1 * | 8/2011 | Feyereisen et al. | 701/120 |

* cited by examiner

*Primary Examiner* — Joseph C Rodriguez
(74) *Attorney, Agent, or Firm* — Armstrong Teasdale, LLP

(57) ABSTRACT

An air traffic control system for control of airport ground traffic includes a graphical display system configured to display a surface map, and configured to enable a controller to input, via a graphical input device, a taxi route along the surface map. Furthermore, the system includes a processor operatively coupled to the graphical display system, wherein the processor is configured to provide the surface map to the graphical display system. The processor is programmed to interpret the taxi route, and modify the taxi route to a taxiway path existing on the surface map. The system includes a transmitter communicatively coupled to the processor, wherein the transmitter configured to transmit the taxiway path to an aircraft, and a datalink interface positioned onboard the aircraft and configured to receive and display the transmitted taxiway path.

20 Claims, 5 Drawing Sheets

SYSTEMS AND METHOD FOR MANAGING AIRPORT GROUND TRAFFIC

BACKGROUND

The field of the disclosure relates generally to air traffic management, and more particularly to generating and relaying ground traffic instructions to an onboard user interface.

As the air travel system becomes saturated, airports are becoming more and more congested. At the busiest airports, it is not uncommon to have 50 or more aircraft taxiing to and from multiple active runways using complex routes involving many different taxiways. System capacity is at or near saturation even during good weather conditions. After an aircraft lands on a runway at an airport, the next step is to taxi the aircraft to a desired destination such as a passenger loading/unloading gate. Ground taxi may add over one hour to travel time for any particular flight, which may be especially true during poor weather conditions. As visibility drops, the number of aircraft that can operate at a given airport decreases rapidly and those aircraft still operating must slow down so as not to miss a turn or a hold short point, or taxi across an active runway without clearance.

A variety of methods are currently in use for aircrews to navigate on the ground. Some known methods includes receiving verbal instructions from air traffic control personnel, writing the instructions down and interpreting those instructions by viewing a paper map of the airport. More specifically, the controller is responsible for coordinating airplane movements on the airport surface by transmitting taxi instructions to the flight crews. These instructions include a series of taxi 'legs' that form a taxi route, and may also include other information pertinent to the taxi route, such as for example hold short instructions. The taxi instructions may be complex, and are typically transmitted verbally to the flight crew. Ground controller workload may be high during busy times as an individual controller may be coordinating multiple airplanes simultaneously.

To effectively use such methods, the pilot must direct attention from outside the aircraft to inside the aircraft, and simultaneously transition from verbal instructions to a visual interpretation of those instructions while looking at a paper airport diagram. A pilot may become confused or lost amid the many runways, taxiways, ramps, and buildings that make up an airport. The problem is more significant at large airports and is particularly significant at night when the multitude of lights can make it more difficult to taxi the aircraft to the desired destination. During low visibility, the aircrew may lose its ability to use forward and peripheral vision because ground references and other airport traffic become harder to see or become obstructed, forcing the aircrew to concentrate their attention outside the aircraft to ensure safe operations. Recently, some other known devices have enabled aircrews to electronically display and orient the airport map and even show the aircraft position on the map.

SUMMARY

In one embodiment, an air traffic control system is provided. The system includes a graphical display system configured to display a surface map, and configured to enable a controller to input, via a graphical input device, a taxi route along the surface map, and a processor operatively coupled to the graphical display system. The processor is programmed to interpret the taxi route, modify the taxi route to a taxiway path existing on the surface map, and output the taxiway path to an aircraft.

In another embodiment, a method for generating and relaying ground traffic instructions to a user interface is provided. The method includes providing a surface map of an airport on a graphical display system that contains real-time representation of ground-based aircraft, and selecting a subject aircraft using a graphical input device. The method includes tracing a taxi route for the aircraft upon the graphical display system, adjusting the traced route to coincide with a taxiway path existing on the surface map, and outputting the taxiway path to the subject aircraft.

In yet another embodiment, an air traffic control system for control of airport ground traffic is provided. The system includes a graphical display system configured to display a surface map, and configured to enable a controller to input, via a graphical input device, a taxi route along the surface map. Furthermore, the system includes a processor operatively coupled to the graphical display system, wherein the processor is configured to provide the surface map to the graphical display system. The processor is programmed to interpret the taxi route, and modify the taxi route to a taxiway path existing on the surface map. The system includes a transmitter communicatively coupled to the processor, wherein the transmitter configured to transmit the taxiway path to an aircraft, and a datalink interface positioned onboard the aircraft and configured to receive and display the transmitted taxiway path.

Various refinements exist of the features noted in relation to the above-mentioned aspects of the present disclosure. Additional features may also be incorporated in the above-mentioned embodiments as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

The following detailed description illustrates the disclosure by way of example and not by way of limitation. The description should enable one skilled in the art to make and use the disclosure, describes several embodiments, adaptations, variations, alternatives, and uses of the disclosure, including what is presently believed to be the best mode of carrying out the disclosure. The disclosure is described as applied to exemplary embodiments, namely, systems and methods for automatically correcting/maintaining trackside communications station output signals. However, it is contemplated that this disclosure has general application to vehicle control and detection systems in industrial, commercial, and residential applications.

Figure 1:
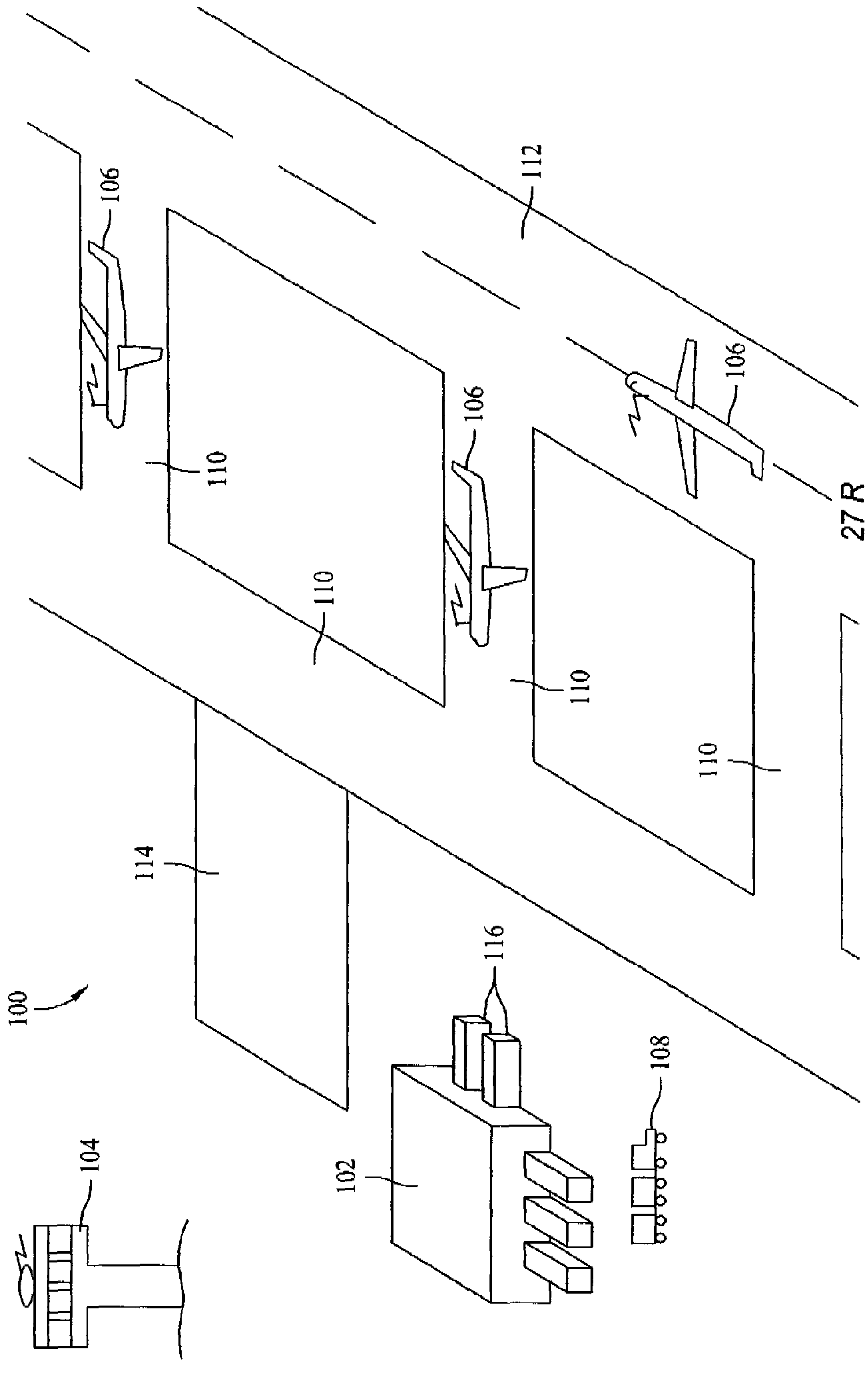
FIG. 1 is a schematic illustration of an exemplary airfield.

FIG. 1 is a schematic illustration of an exemplary airfield 100. In the exemplary embodiment, airfield 100 includes a terminal 102, a manned air traffic control (ATC) tower 104 that includes ground-based personnel/operators (not shown in FIG. 1) that direct ground-based aircraft 106 and vehicles 108 operating on taxiways 110 and runways 112 of airfield 100, and airborne aircraft (not shown in FIG. 1) in a vicinity of airport 100, generally 2 to 5 nautical miles (3.7 to 9.2 km) depending on the airport procedures. More specifically, ATC controllers separate aircraft to prevent collisions, organize and expedite the flow of traffic, and provide information and other support to pilots. ATC controllers may also play a security or defense role during ATC operations. Ground Control (sometimes referred to as Ground Movement Control abbreviated to GMC or Surface Movement Control abbreviated to SMC) is responsible for the airport "maneuvering" areas, or areas not released to the airlines or other users. This generally includes all taxiways 110, inactive runways, holding areas 114, and some transitional aprons or intersections where aircraft arrive having vacated the runway and departure gates 116.

Figure 2:
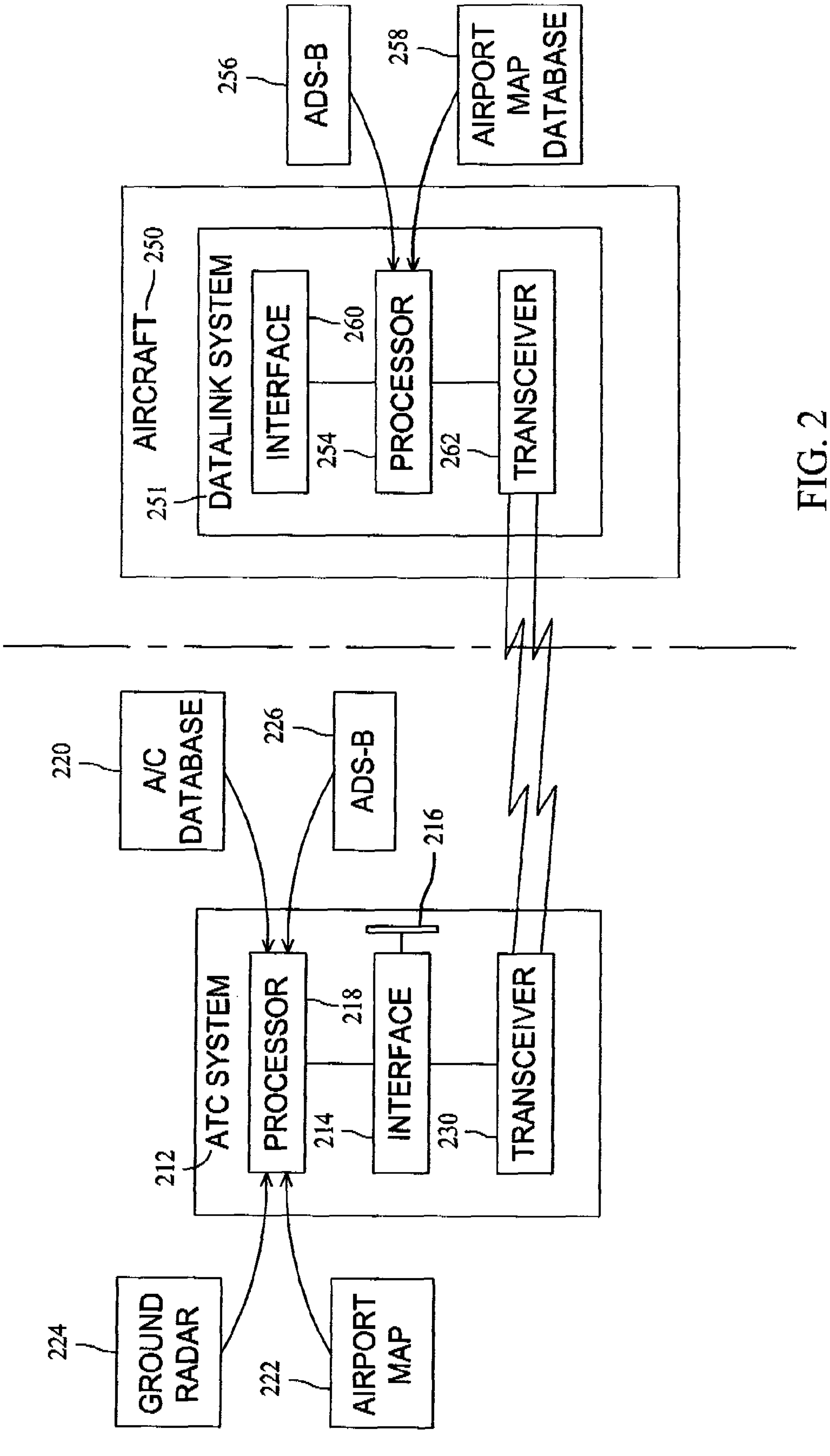
FIG. 2 is a functional block diagram of an air traffic control system used in controlling airport ground traffic, as is shown in FIG. 1.

FIG. 2 is a functional block diagram of an air traffic control system 200 for use in controlling ground-based aircraft 106, as is shown in FIG. 1 for example. In the exemplary embodiment, a ground traffic control system 212 includes a graphical display interface 214 that uses haptic technology, such as for example a WACOM® Cintiq 21UX Interact Pen Display available from Kabushiki Kaisha Wacom Corporation of Saitama, Japan, in combination with a handheld stylus 216 enable a controller to input a series of taxi instructions to a ground based aircraft, as described in more detail herein. Alternatively, graphical display interface 214 may be any type of touch-sensitive interface, such as for example a graphics tablet, a personal digital assistant (PDA), tablet-type mobile computing system, or any such interface that enables ATC system to function as described herein. In an alternative embodiment, controller may use any other type of a graphical input device instead of a handheld stylus, such as for example, a fingertip mounted stylus, fingertip, or any such input device that enables ATC system 212 to function as described herein.

Air traffic control system 212 includes a processor 218 that is communicatively coupled to graphical display interface 214. More specifically, and in the exemplary embodiment, processor 218 is programmed to generate and relay ground traffic instructions to ground-based, taxiing aircraft, as described herein. To enable processor 218 to function as described herein, and in the exemplary embodiment, information, such as aircraft specification data 220 and airport runway and/or taxiway maps 222, is provided to processor 218. Moreover, data is provided to processor 218 from surface ground radar systems 224, as well as data from aircraft-based Automatic Dependent Surveillance-Broadcast (ADS-B) systems 226. Alternatively, any applicable information, such as for example weather data from Automated Weather Observing System (AWOS) equipped units, may be provided to processor 218 that may enable ATC system 220 to function as described herein.

Further, although present embodiments are described with respect to processors and computer programs, as will be appreciated by one of ordinary skill in the art, the present disclosure may also apply to any system and/or program that are configured to generate and relay ground traffic instructions to an aircraft. Processor may include any processor-based or microprocessor-based system, such as a computer system, that includes microcontrollers, reduced instruction set circuits (RISC), application-specific integrated circuits (ASICs), logic circuits, and any other circuit or processor that is capable of executing the functions described herein. For example, as used herein, the term "processor" is not limited to just those integrated circuits referred to in the art as processors, but broadly refers to computers, processors, microcontrollers, microcomputers, programmable logic controllers, application specific integrated circuits, and other programmable circuits. Moreover, processor may be a microprocessor that includes read-only memory (ROM) and/or random access memory (RAM), such as, for example, a 32 bit microcomputer with 2 Mbit ROM, and 64 Kbit RAM. Processor may be part of a computer that may include a device, such as; a floppy disk drive or compact disc-read-only memory (CD-ROM) drive, for reading data from a computer-readable medium, such as a floppy disk, a CD-ROM, a magneto-optical disk (MOD), or a digital versatile disc (DVD). In the exemplary embodiment, processor communicates with (i.e., receives signals from and/or transmits signals to) a memory, a plurality of sensors, and/or a variety of other devices located in ATC tower 104 and/or remotely from ATC tower 104 (shown in FIG. 1, such as ground based aircraft 106 to facilitate generating and relaying ground traffic instructions to aircraft 106, as described in more detail herein.

In the exemplary embodiment, ATC system 212 includes a transceiver 230 communicatively coupled to processor 218. Transceiver 230 wirelessly transmits the derived taxiway path information to ground-based aircraft 106 (shown in FIG. 1) and receives a signal wirelessly from ground-based aircraft 106 in response to the transmitted data, as is described in more detail herein. In an alternative embodiment, any communicative device, such as for example any electronic signal transmitting and receiving device, may be used that enables ATC system 212 to function as described herein.

In the exemplary embodiment, an aircraft 250, such as for example ground-based aircraft 106 shown in FIG. 1, includes an aircraft datalink system 252 having a processor 254. Data and/or information related to airport runway and/or taxiway maps 256 are provided to datalink system processor 254, as well as data from Automatic Dependent Surveillance-Broadcast (ADS-B) systems 258. Alternatively, any applicable information, such as for example weather data from Automated Weather Observing System (AWOS) equipped units, may be provided to datalink system 252 processor that may enable ATC system to function as described herein.

In the exemplary embodiment, aircraft datalink system 252 includes an interface 260 that displays the received taxiway path as a graphical depiction of the desired taxiway path. Alternatively, interface 260 may display the received taxiway path as a text-based instruction. Interface 260 may be any visual display unit or computer monitor that displays generated images and may include a liquid crystal display (LCD) unit, a cathode ray tube (CRT), or any type of interface that enables ATC system 212 to function as described herein. In an alternative embodiment, interface 260 may include a haptic surface in combination with a handheld stylus that enables a pilot or aircrew member to accept, reject and/or modify the received taxiway path directly thereon. Alternatively, interface 260 may be any type of touch-sensitive interface, such as for example a graphics tablet, a personal digital assistant (PDA), tablet-type mobile computing system, or any such interface that enables ATC system 212 to function as described herein.

Aircraft 250 includes a transceiver 262 that is communicatively coupled to processor 254. In the exemplary embodiment, transceiver 262 transmits data regarding the accepted, rejected and/or modified taxiway path to the ATC system transceiver 230, as is described in more detail herein. In an alternative embodiment, any communicative device, such as for example any electronic signal transmitting and receiving device, may be used that enables ATC system 212 to function as described herein.

Figure 3:
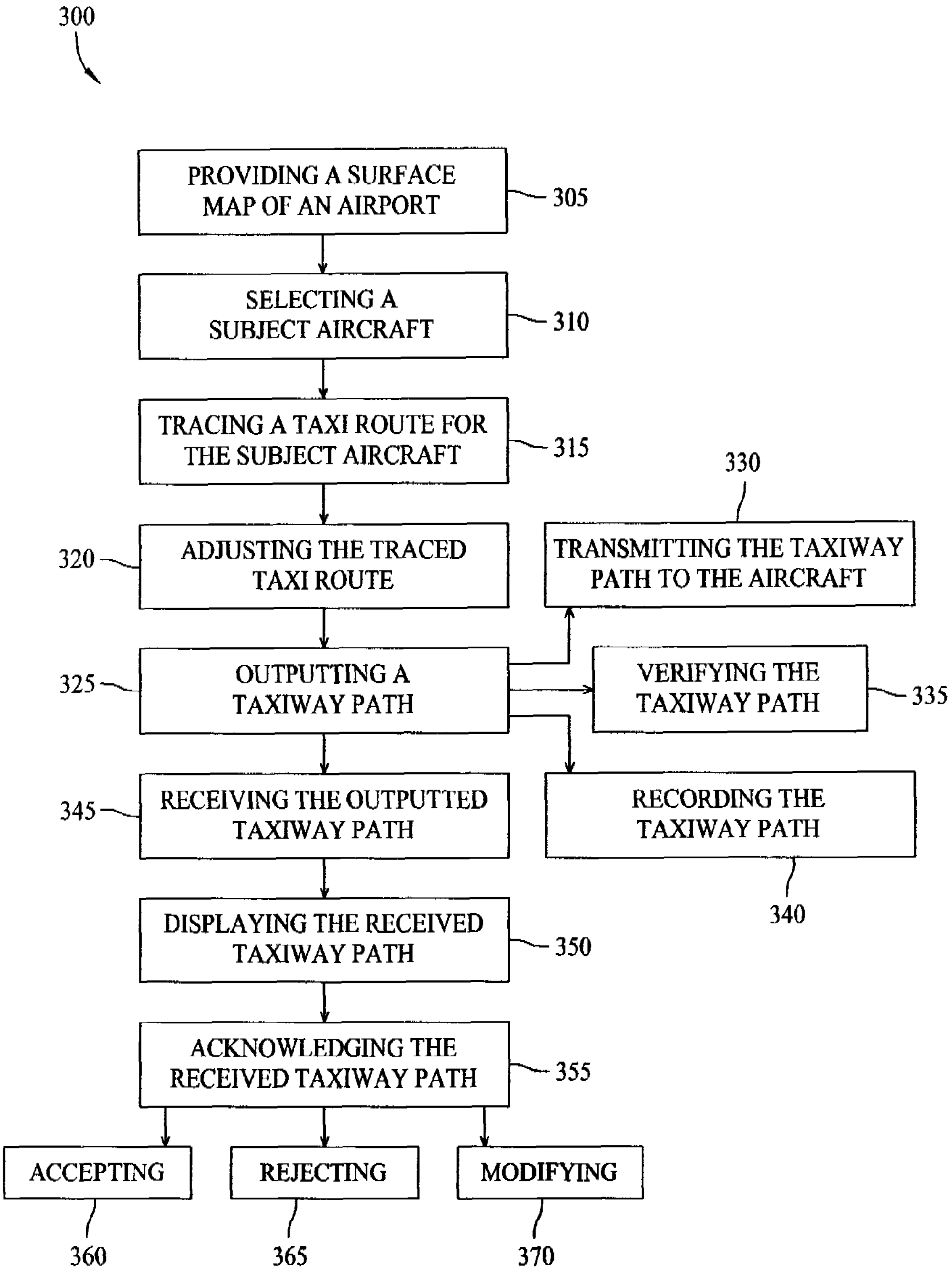
FIG. 3 is a flowchart illustrating a method for managing airport ground traffic.

FIG. 3 shows a flowchart illustrating a method 300 for managing airport ground traffic (shown in FIG. 1) used by an air traffic control systems designed to generate and relay instructions to ground-based aircraft. In the exemplary embodiment, method 300 is implemented by systems 212 and 252 shown in FIG. 2, however, method 300 is not limited to implementation on systems 212 and 252, but rather, method 300 may be embodied on a computer readable medium as a computer program, and/or implemented and/or embodied by any other suitable means. The computer program may include a code segment that, when executed by a processor, configures the processor to perform one or more of the function of method 300.

In the exemplary embodiment, method 300 includes providing 305 a surface map of an airport, such as for example exemplary airfield 100 shown in FIG. 1, on a graphical display system that contains real-time representation of ground-based aircraft. More specifically and in the exemplary embodiment, providing 305 a surface map of an airport includes displaying a ground radar image of airfield 100, a visual display of airfield 100, and/or a graphical illustration of airfield 100. In the exemplary embodiment, such displays are provided on a graphical display interface that enables a controller to input a series of taxi instructions to a ground based aircraft, as described in more detail herein. The graphical display interface may use haptic technology or be any type of touch-sensitive interface, such as for example a graphics tablet, a personal digital assistant (PDA), tablet-type mobile computing system.

In the exemplary embodiment, method 300 includes selecting 310 a subject aircraft using a graphical input device, and tracing 315 a taxi route for the aircraft upon the graphical display system. More specifically and in the exemplary embodiment, selecting 310 a subject aircraft and tracing 315 a taxi route for the aircraft includes using a handheld stylus to select the subject aircraft on the graphical display system. Additionally, a route may be selected that will facilitate enabling the selected aircraft to maneuver along the selected route without a threat of conflict and/or contact with other aircraft. Alternatively, a controller may use any other type of graphical input device instead of a handheld stylus, such as for example, a fingertip mounted stylus, fingertip, or any such graphical input device.

In the exemplary embodiment, method 300 includes adjusting 320 the traced route to coincide with a taxiway path existing on the surface map. More specifically, a processor, such as ATC system processor 218 shown in FIG. 2, is programmed to anchor, or "snap", the traced route to a route displayed on the airport taxiway map such that a readable route is displayed on the graphical display interface, such as interface 214 and interface 260, both shown in FIG. 2.

Method 300 includes outputting 325 the adjusted 325 taxiway path to the subject aircraft. More specifically and in the exemplary embodiment, outputting 325 the taxiway path to the subject aircraft includes ATC personnel located on the ground, i.e. in ATC tower 104, transmitting 330 the taxiway path to the aircraft. In the exemplary embodiment, a communicative device, such as transceiver 230 shown in FIG. 2, wirelessly transmits the derived taxiway path information from ATC tower 104 to ground-based aircraft 106 (shown in FIG. 1) and receives a signal wirelessly from ground-based aircraft 106 in response to the transmitted data, as is described in more detail herein. Moreover, in the exemplary embodiment, outputting 325 the taxiway path to the subject aircraft includes verifying 335 the taxiway path, and recording 340 the taxiway path onto a computer readable medium. More specifically, the taxiway path derived from method 300 may be output recorded to a memory within processors 218 and/or 254 (shown in FIG. 2), a drive (not shown), a display device, such as display interfaces 214 and/or 260 (shown in FIG. 1), and/or any other suitable component. In the exemplary embodiment, such devices are located in ATC tower 104. Alternatively, processors 218 and/or 254 (shown in FIG. 2), the drive (not shown), the display device may be located at any location that enables ground traffic control system 212 to function as described herein.

In one exemplary embodiment, outputting 325 the taxiway path to the subject aircraft includes transmitting a plurality of taxi instructions that are interpreted from gestures made by the controller to the subject aircraft. The gestures may include any applicable graphical or textual instruction (dependent upon the type of display being given, as described herein), such as for example, an instruction to hold short on a particular taxiway, and/or an instruction to follow another aircraft for a specified distance.

In the exemplary embodiment, method 300 further includes receiving 345 the outputted 325 taxiway path at a datalink interface positioned onboard the ground-based aircraft, and displaying 350 the received 345 taxiway path. In the exemplary method 300, displaying 350 the taxiway path includes displaying a graphical instruction of the chosen taxiway path. Alternatively, displaying 350 the taxiway path may include displaying a text-based instruction of the taxiway path.

Subsequent to displaying 350 of the outputted taxiway instructions, method 300 includes acknowledging 355 the received instruction. In the exemplary embodiment, acknowledging 355 the received instruction may include one of accepting 360 the received the outputted taxiway path, rejecting 365 the received the outputted taxiway path, and modifying 370 the received outputted taxiway path. More specifically, a pilot or aircrew member upon the subject aircraft will receive 345 the taxiway path and will provide feedback to the ATC tower that the instructions were received by either accepting 360, rejecting 365, or modifying 370 the instruction on the datalink interface, as is described in more detail herein. Alternatively, the air traffic controller may modify the instruction, such as for example by amended the original instructions or adding additional instructions, i.e. hold-short instructions. Following acknowledgement 355 of the instruction, the taxiway path may be updated 375 on the graphical display interface 214 and the datalink interface 260.

Figure 4:
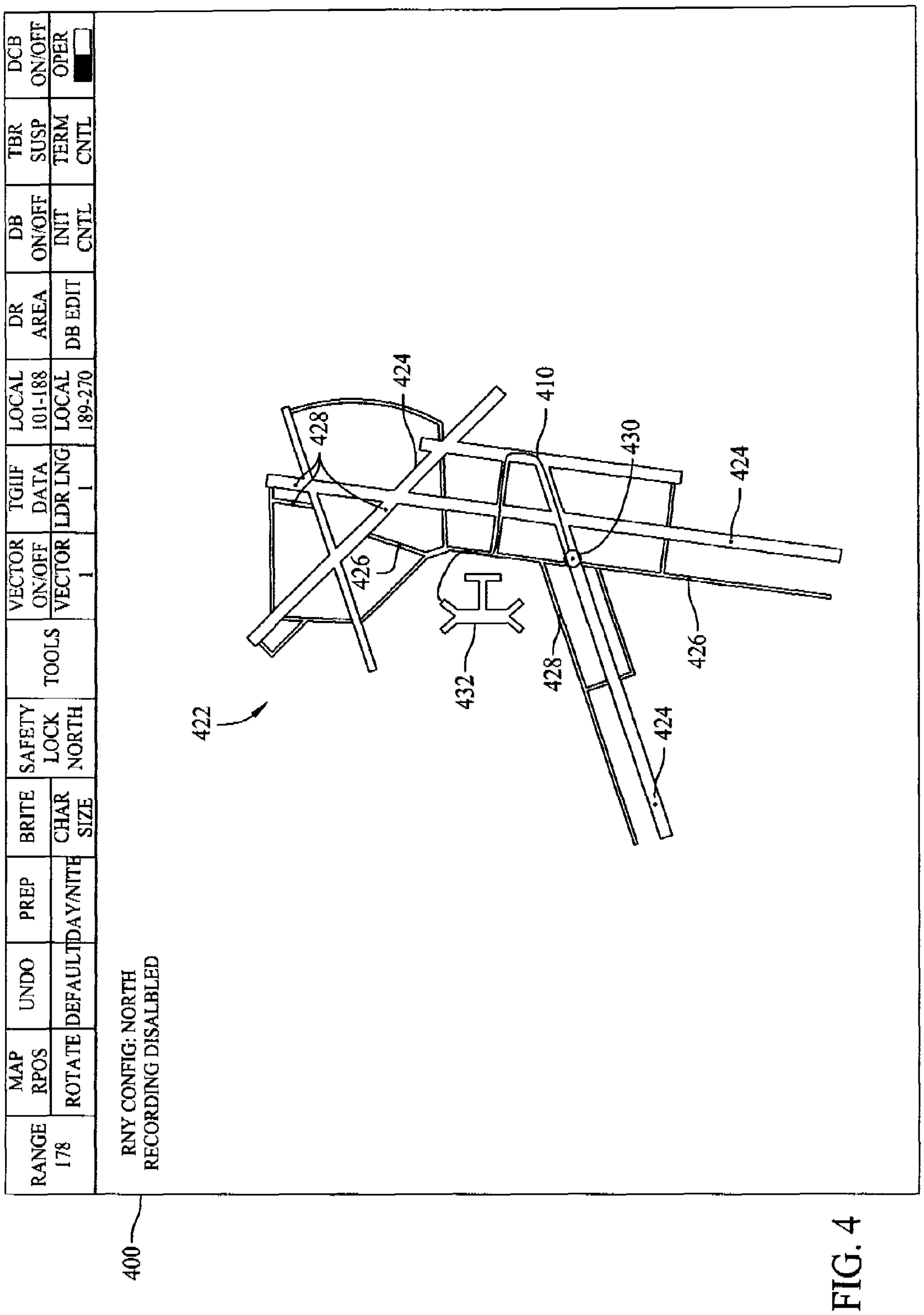
FIG. 4 is a schematic illustration of an interface display of the exemplary airfield shown in FIG. 1, with a hand-drawn taxiway path.
Figure 5:
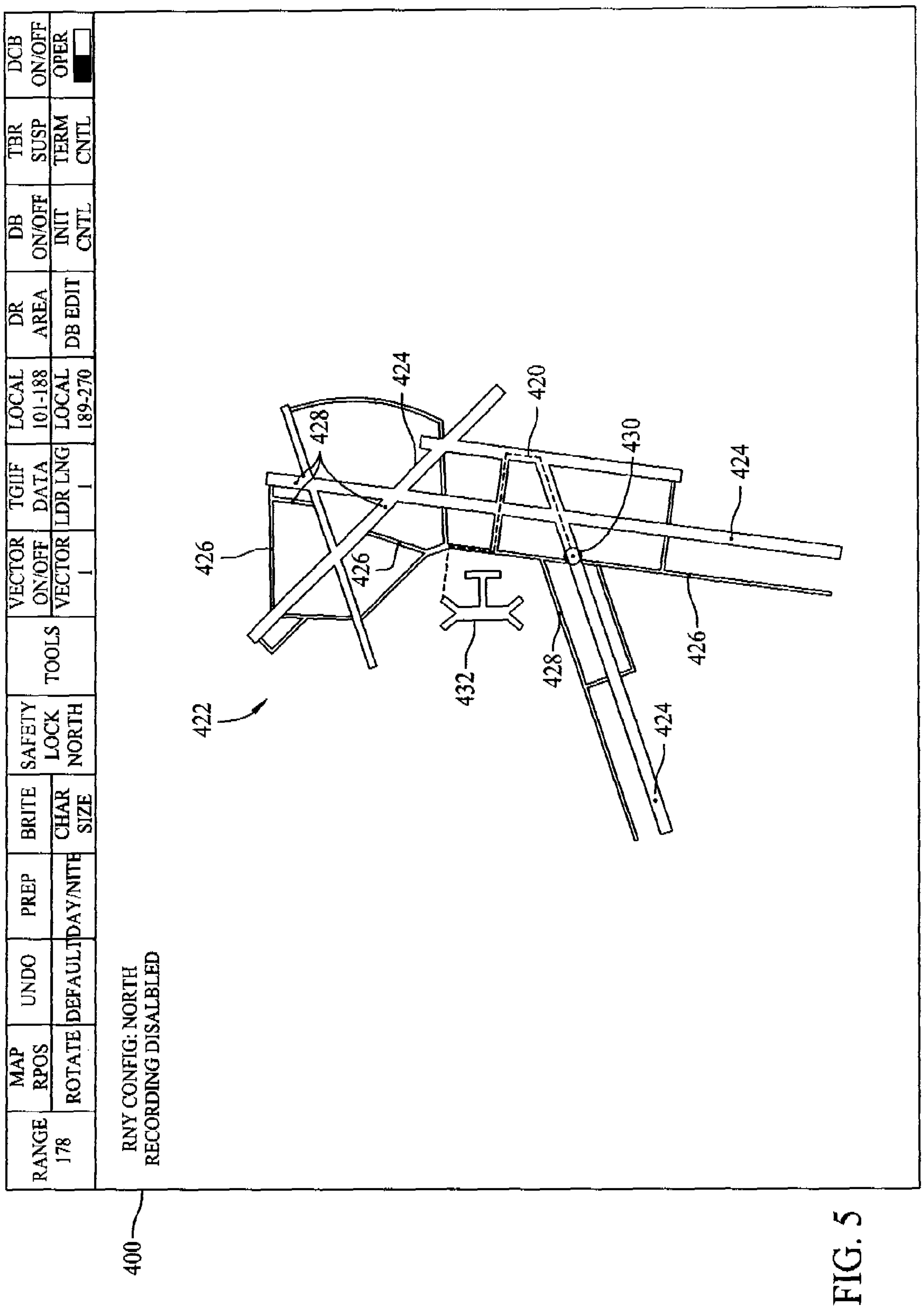
FIG. 5 is a schematic illustration of the interface display shown in FIG. 4 with an adjusted taxiway path.

FIG. 4 is a schematic illustration of an interface display 400 of ATC system 212 shown in FIG. 1, with a hand-drawn taxiway path 410. FIG. 5 is a schematic illustration of interface display 400 with an adjusted (anchored) taxiway path 420. In the exemplary embodiment, a taxiway map 422 of airfield 100 is displayed on interface 400. Taxiway map 422 includes runways 424 and taxiways 426. Ground based aircraft 428 are displayed at their positions upon runways 424 and/or taxiways 426 in real-time. A subject aircraft 430 is selected, as described herein. As shown in FIG. 4, the ATC operator draws taxiway path 410 that enables a pilot to maneuver aircraft to a desired end location, such as a terminal 432. As shown in FIG. 5, ATC system 212 (shown in FIG. 2) will adjust the route as described herein, and this adjusted path 420 will be displayed on datalink system interface 260, as shown in FIG. 2 and described herein.

Exemplary embodiments of airport ground traffic control systems are described in detail above. The above-described systems facilitate using natural pen gestures on a touch screen interface to graphically input directional path routing instructions to aircraft traffic while on the airport surface environment. Use of this system and the associated methods reduces the typical verbal command and acknowledgement communications by providing a system wherein ground controller personnel may graphically draw taxi routing directions using natural gestures directly on a touch screen to assist pilots and aircrew in the maneuvering of there aircraft around the airport environment.

Additionally, the systems described herein filters variance in the actual desired route and anchors the hand-drawn route to an appropriate taxi way displayed of the interface. Once anchored, the system transmits this routing information via data link to the aircraft to be acknowledged by the pilot in addition to loading within the onboard aircraft system. Once acknowledged, the display will receive the command and parse the data appropriately for the controller. Natural hand gestures can be utilized to create or draw the appropriate routing structures, for example following, and aircraft holding short, and/or passing.

Although the foregoing description contains many specifics, these should not be construed as limiting the scope of the present disclosure, but merely as providing illustrations of some of the presently preferred embodiments. Similarly, other embodiments may be devised which do not depart from the spirit or scope of the present disclosure. Features from different embodiments may be employed in combination. The scope of the disclosure is, therefore, indicated and limited only by the appended claims and their legal equivalents, rather than by the foregoing description. All additions, deletions and modifications to the embodiments described herein which fall within the meaning and scope of the claims are to be embraced thereby.

A used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

This written description may use examples to describe embodiments of the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An air traffic control system comprising:

a graphical display interface configured to display a surface map, and configured to enable a controller to input, via a graphical input device, a hand drawn user-provided taxi route and taxi instructions along the surface map; and a processor communicatively coupled to said graphical display system, said processor programmed to:

interpret the hand drawn user-provided taxi route and taxi instructions;

modify the hand drawn user-provided taxi route and taxi instructions to coincide with a predefined taxiway path existing on the surface map; and output the modified hand drawn user-provided taxi route and taxi instructions to an aircraft.

2. The system in accordance with claim 1 wherein said graphical input device comprises at least one of a handheld stylus and a finger tip.

3. The system in accordance with claim 1 further comprising a datalink interface positioned onboard the aircraft and configured to display the predefined taxiway path.

4. The system in accordance with claim 3 wherein said datalink interface is configured to display the predefined taxiway path as at least one of a text-based instruction and a graphical instruction.

5. The system in accordance with claim 3 wherein said datalink interface is further configured to allow onboard personnel at least one of accept, reject and modify the predefined taxiway path.

6. The system in accordance with claim 1 wherein said processor comprises a flight management computer.

7. The system in accordance with claim 1 wherein said surface map comprises one of a ground radar image, a visual display and a graphical illustration of an airport map.

8. The system in accordance with claim 1 further comprising a transmitter communicatively coupled to said processor, said transmitter configured to transmit the predefined taxiway path to an aircraft.

9. The system in accordance with claim 1 wherein said graphical display interface comprises a haptic interface.

10. A method for managing airport ground traffic, said method comprising:

providing a surface map of an airport on a graphical display system that contains real-time representation of ground-based aircraft;

selecting a subject aircraft using a graphical input device;

receiving, using the graphical input device, a hand drawn user-provided taxi route and taxi instructions for the aircraft upon the graphical display system;

adjusting the hand drawn user-provided taxi route and taxi instructions, using a programmed device, to coincide with a predefined taxiway path existing on the surface map; and outputting the adjusted the hand drawn user-provided taxi route and taxi instructions to the subject aircraft.

11. The method in accordance with claim 10 further comprising:

receiving the predefined taxiway path at a datalink interface positioned onboard the aircraft; and displaying the predefined taxiway path.

12. The method in accordance with claim 11 wherein displaying the predefined taxiway path further comprises displaying at least one of a text-based instruction and a graphical instruction.

13. The method in accordance with claim 11 further comprising at least one of:

accepting the received predefined taxiway path;

rejecting the received predefined taxiway path; and modifying the received predefined taxiway path by at least one of an air traffic controller and an aircrew member.

14. The method in accordance with claim 13 further comprising updating the predefined taxiway path on the graphical display system and the datalink interface.

15. The method in accordance with claim 10 wherein selecting a subject aircraft and tracing a user-provided taxi route for the aircraft further comprises utilizing at least one of a stylus and a fingertip to select the subject aircraft.

16. The method in accordance with claim 10 wherein providing a surface map of an airport on a graphical display system further comprises displaying one of a ground radar image of the airport, a visual display of an airport and a graphical illustration of an airport.

17. The method in accordance with claim 10 wherein outputting the predefined taxiway path to the subject aircraft further comprises at least one of:

transmitting the predefined taxiway path to the aircraft;

verifying the predefined taxiway path; and recording the predefined taxiway path onto a computer readable medium.

18. The method in accordance with claim 10 further comprising executing a conflict check to facilitate substantially ensure that the predefined taxiway path is substantially clear.

19. The method in accordance with claim 10 wherein outputting the predefined taxiway path to the subject aircraft further comprises transmitting a plurality of gestures to the aircraft.

20. A system for managing airport ground traffic, said system comprising:

an air traffic control apparatus comprising:

a graphical display interface configured to display a surface map, and configured to enable a controller to input, via a graphical input device, a hand drawn user-provided taxi route and taxi instructions along the surface map;

a processor communicatively coupled to said graphical display system, said processor configured to provide the surface map to said graphical display system, said processor programmed to:

interpret the hand drawn user-provided taxi route and taxi instructions; and modify the hand drawn user-provided taxi route and taxi instructions to coincide with a predefined taxiway path existing on the surface map; and a transmitter communicatively coupled to said processor, said transmitter configured to transmit the hand drawn user-provided taxi route and taxi instructions to an aircraft; and an aircraft datalink system comprising:

a transceiver configured to receive the hand drawn user-provided taxi route and taxi instructions;

an interface positioned onboard the aircraft and configured to display the hand drawn user-provided taxi route and taxi instructions.

* * * * *